United States Patent
Levy et al.

(10) Patent No.: US 9,712,339 B2
(45) Date of Patent: Jul. 18, 2017

(54) BUS ARCHITECTURE AND ACCESS METHOD FOR PLASTIC WAVEGUIDE

(71) Applicant: Infineon Technologies AG, Neubiberg (DE)

(72) Inventors: David Levy, Wernberg (AT); Dirk Hammerschmidt, Villach (AT); Harald Witschnig, Landskron (AT)

(73) Assignee: Infineon Technologies AG, Neubiberg (DE)

( * ) Notice: Subject to any disclaimer, the term of this patent is extended or adjusted under 35 U.S.C. 154(b) by 64 days.

(21) Appl. No.: 14/260,339

(22) Filed: Apr. 24, 2014

(65) Prior Publication Data

US 2015/0312053 A1    Oct. 29, 2015

(51) Int. Cl.
| | |
|---|---|
| *H04L 12/00* | (2006.01) |
| *H04L 12/417* | (2006.01) |
| *H04B 7/15* | (2006.01) |
| *H04L 12/741* | (2013.01) |
| *H04L 12/64* | (2006.01) |
| *H04L 12/40* | (2006.01) |

(52) U.S. Cl.
CPC ........... *H04L 12/417* (2013.01); *H04B 7/15* (2013.01); *H04L 12/6418* (2013.01); *H04L 45/74* (2013.01); *H04L 2012/40273* (2013.01)

(58) Field of Classification Search
CPC ............................ H01Q 19/06; H04L 67/2842
See application file for complete search history.

(56) References Cited

U.S. PATENT DOCUMENTS

| | | | | |
|---|---|---|---|---|
| 4,731,880 A | * | 3/1988 | Ault ...................... | H04B 10/272 370/453 |
| 5,802,056 A | * | 9/1998 | Ferguson ............ | H04L 12/4608 370/401 |
| 6,389,029 B1 | * | 5/2002 | McAlear ................ | H04L 12/46 370/402 |
| 6,611,635 B1 | | 8/2003 | Yoshimura et al. | |

(Continued)

OTHER PUBLICATIONS

U.S. Appl. No. 14/272,619, filed May 8, 2014.

(Continued)

*Primary Examiner* — John Blanton
(74) *Attorney, Agent, or Firm* — Eschweiler & Potashnik, LLC

(57) ABSTRACT

The present disclosure relates to a system that uses a switch to convey wireless signals between a plurality of electronic devices interconnected by dielectric waveguides. In some embodiments, the system includes a plurality of electronic devices respectively having a transceiver element that generates a wireless signal that transmits a data packet. A switch receives the wireless signal from a first one of the plurality of electronic devices and re-transmits the wireless signal to a second one of the plurality of electronic devices. A plurality of dielectric waveguides convey the wireless signal between the plurality of electronic devices and the switch. Respective dielectric waveguides have a dielectric material disposed at a location between one of the plurality of electronic devices and the switch. Using the switch to convey wireless signals between the plurality of electronic devices provides a system that has a low wireless signal attenuation and reduced number of transceivers.

20 Claims, 4 Drawing Sheets

(56) References Cited

U.S. PATENT DOCUMENTS

| | | | |
|---|---|---|---|
| 7,239,288 B2* | 7/2007 | Lynch | H01Q 19/32 |
| | | | 343/833 |
| 2004/0063430 A1* | 4/2004 | Cave | H04W 36/30 |
| | | | 455/436 |
| 2005/0031347 A1* | 2/2005 | Soto | H04B 10/2503 |
| | | | 398/58 |
| 2005/0239456 A1* | 10/2005 | Sung | E05B 65/0864 |
| | | | 455/427 |
| 2013/0134730 A1* | 5/2013 | Ricci | G06F 9/54 |
| | | | 296/24.34 |
| 2013/0308581 A1 | 11/2013 | Rofougaran | |
| 2015/0207680 A1* | 7/2015 | Ivanov | H04B 1/40 |
| | | | 455/73 |
| 2015/0263403 A1* | 9/2015 | Spella | H01P 5/08 |
| | | | 343/905 |

OTHER PUBLICATIONS

Non Final Office Action Dated Aug. 5, 2016 U.S. Appl. No. 14/272,619.

Notice of Allowance Dated Jan. 5, 2017 U.S. Appl. No. 14/272,619.

Non-Final Office Action received on May 18, 2017 in connection with U.S. Appl. No. 15/474,444.

* cited by examiner

BUS ARCHITECTURE AND ACCESS METHOD FOR PLASTIC WAVEGUIDE

BACKGROUND

Modern day electronic systems (e.g., mobile phones, automobiles, etc.) often provide for a wide range of functionalities. Such functionalities can be achieved by integrating together a large number of separate electronic devices, which are respectively configured to perform specific functions. During operation, the separate electronic devices communicate with each other by transferring data. For example, modern day automobiles may comprise many different sensors (e.g., a digital camera able to capture digital images, a pressure sensor able to detect a pressure, etc.) that transfer data to one or more micro-processors, which that process the sensor data before further transferring the processed data to a display configured to display an image to a driver.

DETAILED DESCRIPTION

Figure 1:
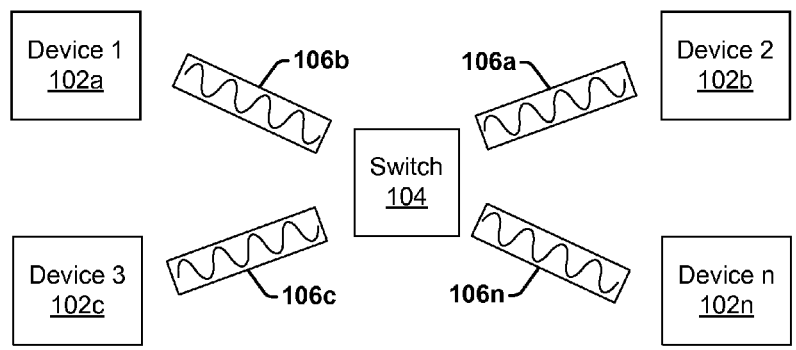
FIG. 1 is a block diagram of some embodiments of a system having a switch configured to transfer data between a plurality of electronic devices by way of dielectric waveguides.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Metal interconnect wires (e.g., copper wires) are often used to provide data connections between different electronic devices. In complex systems having a large number of electronic devices, metal interconnect wires may extend between each pair of electronic devices (i.e., in a system where n electronic communicate with each other, this results in n/2*n−1 interconnection paths). However, metal wire interconnects provide for a limited data transfer bandwidth. Therefore, as data rates continue to grow, a larger number of metal wire interconnects (e.g., 30 or 40 metal wire interconnects) may be used to provide for sufficient data transfer bandwidth between each pair of electronic devices. In complex systems, the number of interconnect wires may become very large, resulting in negative consequences including a large weight, a large expense, and a complex layout that has a high risk of failure and high risk of cross-talk between metal wire interconnects.

To eliminate these problems, short range wireless communication has been proposed as an alternative solution to transfer data between electronic devices. Short wave wireless communication transfers data using wireless signals (e.g., RF signals) that provide for a larger bandwidth than conventional metal wire interconnects. However, short range wireless communications exhibit large data losses over a few centimeter distance due to attenuation of the wireless signal in free space. The attenuation of wireless signals makes wireless data transmission through free space an unviable option for data transmission over a distance of a few centimeters.

Accordingly, the present disclosure relates to a simple system that uses a switch to convey wireless signals between a plurality of electronic devices interconnected by dielectric waveguides. In some embodiments, the system comprises a plurality of electronic devices respectively comprising a transceiver element configured to generate a wireless signal that transmits a data packet. A switch is configured to receive the wireless signal from a first one of the plurality of electronic devices and to re-transmit the wireless signal to a second one of the plurality of electronic devices. A plurality of dielectric waveguides are configured to convey the wireless signal between the plurality of electronic devices and the switch. Respective dielectric waveguides comprise a dielectric material disposed at a location between one of the plurality of electronic devices and the switch. Using the switch to convey the wireless signals between the plurality of electronic devices reduces a number of transceivers (and dielectric waveguides) used to interconnect the plurality of electronic devices, thereby providing for a simple system that has a low wireless signal loss (i.e., attenuation).

FIG. 1 is a block diagram of some embodiments of a system 100 having a switch 104 configured to transfer data between a plurality of electronic devices 102a-102n by way of dielectric waveguides 106a-106n.

The system 100 comprises a plurality of electronic devices 102a-102n and a switch 104. In various non-limiting embodiments, the plurality of devices 102a-102n may comprise one or more of a micro-controller, an integrated chip, a digital camera, and/or a display, for example. In some embodiments, the system 100 may comprise a printed circuit board (PCB) or a mother board. In other embodiments, the system 100 may comprise an integrated chip package or an automotive/transportation system. For example, in some embodiments, the plurality of devices 102a-102n may comprise a rear car camera, a microcontroller, and a dashboard display disposed within an automobile.

One or more of the plurality of electronic devices 102a-102n are configured to generate data packets, which are to be transmitted to another one of the plurality of electronic devices 102a-102n. For example, a first electronic device 102a comprising a rear car camera may be configured to capture an image that is conveyed as a data packet to a second electronic device 102b comprising a dashboard display element. To transmit and receive the data packets, the plurality of electronic devices 102a-102n respectively have a transceiver element configured to transmit and to receive wireless signals (e.g., RF signals) comprising a data packet.

Dielectric waveguides 106a-106n are disposed between respective ones of the plurality of electronic devices 102a-102n and the switch 104. For example, a first dielectric waveguide 106a is disposed between a first electronic device 102a and the switch 104, a second dielectric waveguide 108b is disposed between a second electronic device 102b and the switch 104, etc. The dielectric waveguides 106a-106n are configured to reduce attenuation of the wireless signals travelling between the electronic devices 102a-102n and the switch 104 by confining the wireless signals by total internal reflection (i.e., a change in refractive index due to the change in dielectric constant at a surface of a dielectric waveguide causes electromagnetic waves carrying the wireless signal to be repeatedly reflected between opposite walls of a dielectric waveguide as the wireless signal travels through the waveguide). The dielectric waveguides 106a-106n also provide for a relatively low cross-talk (i.e., noise) in comparison to metal interconnect wires. In some embodiments, the dielectric waveguides 106a-106n may comprise solid rods or cables of dielectric material extending between the plurality of electronic devices 102a-102n and the switch 104.

The switch 104 is configured to receive a wireless signal comprising a data packet from one of the plurality of electronic devices 102a-102n and to re-transmit the data packet as a wireless signal via a dielectric waveguide 106a-106n to another one of the plurality of electronic devices 102a-102n. For example, the switch 104 may receive a data packet from a first electronic device 102a and re-transmit the data packet to a second electronic device 102b and/or to a third electronic device 102c. Since the plurality of electronic devices 102a-102n are connected to the switch 104 by way of the dielectric waveguides 106a-106n, the switch 104 is able to act as a hub that reduces the overall number of dielectric waveguides by eliminating the need for dielectric waveguides between each of the plurality of electronic devices (e.g., a hub that eliminates the need for a first waveguide between electronic devices 102a and 102b, a second waveguide between electronic devices 102a and 102c, etc.). By operating the switch 104 to receive data packets and to re-transmit the received data packets, the switch 104 enables the transmission of a data packet from one of the plurality of electronic devices 102a-102n to any other one of the plurality of electronic devices 102a-102n.

In some embodiments, a number of the plurality of dielectric waveguides 106a-106n may be equal to a number of the plurality of electronic devices 102a-102n. For example, for a system 100 having ten (10) electronic devices, the number of dielectric waveguides 106a-106n may be equal to 10 (i.e., one dielectric waveguide between each of the plurality of electronic devices and the switch). In such embodiments, the switch 104 is configured to enable the transmission of a data packet from one of the plurality of electronic devices 102a-102n to any other one of the plurality of electronic devices 102a-102n using a relatively small number of transceivers and dielectric waveguides.

Figure 2:
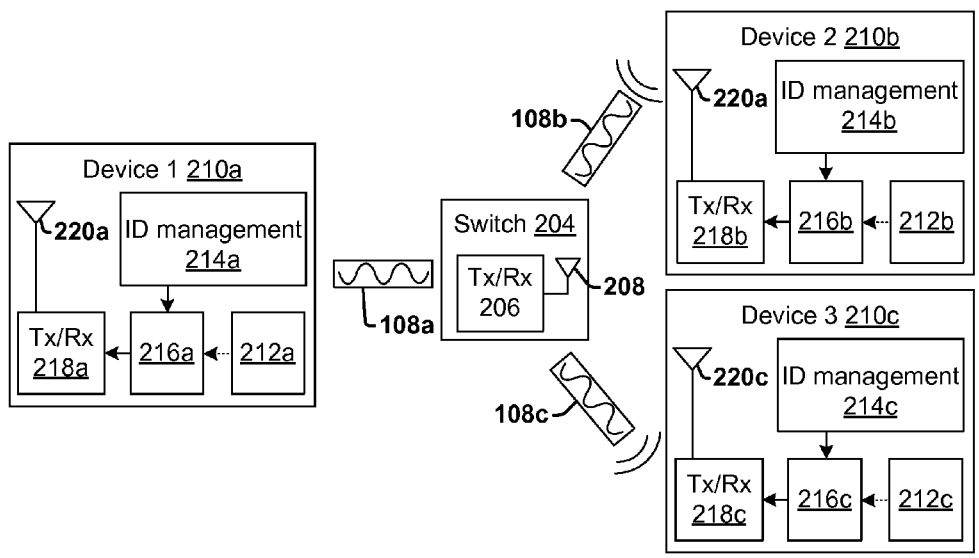
FIG. 2 is a block diagram of some additional embodiments of a system having a switch configured to transfer data between a plurality of electronic devices by way of dielectric waveguides.

FIG. 2 is a block diagram of some additional embodiments of a system 200 having a switch 204 configured to transfer data between a plurality of electronic devices 210a-210c by way of dielectric waveguides 108a-108c.

The plurality of electronic devices 210a-210c respectively comprise a data generation element 212, an ID management element 214, an appending element 216, and a transceiver chain 218 connected to an antenna 220. The data generation element 212 is configured to generate a data frame comprising data. In some embodiments, the data frame may include data corresponding to an image captured by an electronic device 210 comprising a digital camera, or data corresponding to a tire pressure measurement captured by an electronic device 210 comprising a tire pressure sensor, for example.

The ID management element 214 is configured to generate a destination ID corresponding to an electronic device to which the data frame is to be sent. The appending element 216 is configured to append the destination ID to the data frame to generate a data packet, which is provided from the appending element 216 to the transceiver chain 218. The transceiver chain 218 modulates the data packet onto a carrier wave. The carrier wave is provided to the antenna 220 that wireless transmits the data packet as a wireless RF signal.

The plurality of electronic devices 210a-210c are in communication with a switch 204 by way of a plurality of dielectric waveguides 108a-108c. Respective ones of the plurality of dielectric waveguides 108a-108c are disposed between one of the plurality of electronic devices 210a-210c and the switch 204. The wireless RF signal is provided from one of the plurality of electronic devices 210a-210c to a dielectric waveguide 108, which conveys the wireless RF signal to the switch 204.

The switch 204 comprises a transceiver element comprising an antenna 208 connected to a transceiver chain 206. The transceiver element is configured receive the wireless RF signal and to re-transmit the wireless RF signal. In some embodiments, the antenna 208 may comprise an isotropic antenna that is configured to re-transmit the wireless RF signal with a substantially same energy over a 360° radius. In such embodiments, the wireless RF signal is provided to the plurality of dielectric waveguides 108a-108n which concurrently convey the re-transmitted wireless RF signal to the plurality of electronic devices 210a-210c.

Upon receiving the re-transmitted wireless RF signal, the ID management elements 214a-214c within the plurality of electronic devices 210a-210c will read the destination ID from the wirelessly transmitted data packet and determine whether the destination ID corresponds to a corresponding electronic device. If the destination ID corresponds to the electronic device (i.e., if the destination ID indicates that the packet is intended for the electronic device), the electronic device will accept the data packet. If the destination ID does not correspond to the electronic device (i.e., if the destination ID indicates that the packet is not intended for the electronic device), the electronic device will ignore the data packet.

For example, if the first electronic device 210a is to transmit a data packet to the third electronic device 210c, the first electronic device 210a will generate a data packet having a destination ID corresponding to the third electronic device 210c. The data packet will be transmitted as a wireless RF signal from the first electronic device 210a to the switch 204 via dielectric waveguide 108a. The switch 204 will then re-transmit the data packet to the plurality of dielectric waveguides 108a-108n. Upon receiving the data packet, the plurality of electronic devices 210a-210c will read the destination ID. Since the destination ID does not correspond to the first or second electronic devices, 210a and 210b, the first and second electronic devices, 210a and 210b, will ignore the data packet. However, upon receiving the data packet, the third electronic device 210c will accept the data packet since the destination ID corresponds to third electronic device 210c.

Figure 3A:
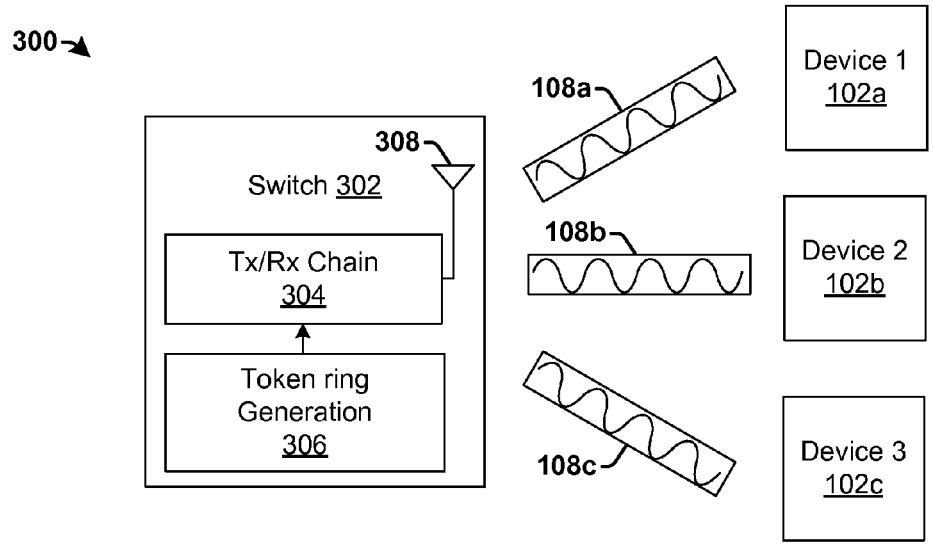
FIG. 3A is a block diagram of some embodiments of a system having a switch comprising a token ring generation element configured to implement a token ring control system that prevents collisions between data packets at the switch.

FIG. 3A is a block diagram of some embodiments of a system 300 having a plurality of electronic devices interconnected by dielectric waveguides 108a-108c and a switch 302. The switch 302 comprises a token generation element 306 configured to implement a token ring control system to prevent collisions of data packets at the switch 302.

The system 300 comprises a switch 302 in communication with a plurality of electronic devices 102a-102c. Since the plurality of electronic devices 102a-102c can communicate with the switch 302, collisions between data packets sent by the plurality of electronic devices can occur at the switch. To prevent collisions between data packets the switch 302 comprises a token generation element 306.

The token generation element 306 is configured to generate a token that is provided to the transceiver chain 304. The transceiver chain 304 is configured to transmit the token to one or more of the plurality of electronic devices 102a-102c. The token grants communications rights to one of the plurality of electronic devices (e.g., 102a) that receives the token, thereby allowing the electronic device (e.g., 102a) to transmit data packets to the switch 302. Other electronic devices that are not granted communication rights hare not able to transmit data packets to the switch 302. In some embodiments, the token may comprise an ID number that corresponds to one of the plurality of electronic devices. In such embodiments, if an electronic device has an ID number that matches the token, the electronic device is granted communication rights.

In some embodiments, during operation of system 300, the token ring generation element will generate tokens that are sequentially provided to different ones of the plurality of electronic devices 102a-12c nodes to control the transmission of data by the plurality of electronic devices 102a-102c.

Figure 3B:
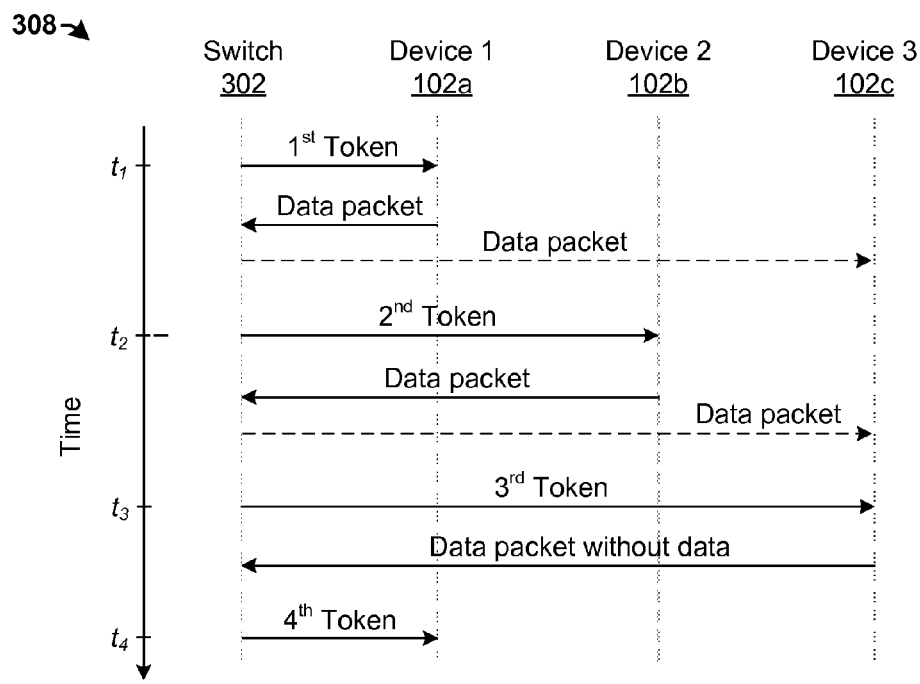
FIG. 3B is a timing diagram showing operation of the token ring control system of FIG. 3A.

For example, FIG. 3B illustrates a timing diagram 308 showing operation of the system 300. At a first time $t_1$, the token generation element 306 generates a first token, which is provided from the switch 302 to a first electronic device 102a. Upon receiving the first token, the first electronic device 102a is granted permission to transmit data. The first electronic device 102a transmits a first data packet to the switch 302. In some embodiments, the first data packet may comprise a destination ID, data content, and a response token that tells the switch 302 that the first electronic device 102a has finished transmitting data. The switch 302 may then re-transmits the first data packet, comprising the destination ID and the data content (but without the response token), which is received and accepted at a destination electronic device 102c.

After the first transaction is done, the token generation element 306 generates a second token. At a second time $t_2$, the second token is provided from the switch 302 to a second electronic device 102b. Upon receiving the second token, the second electronic device 102b is granted permission to transmit data. The second electronic device 102b transmits a second data packet to the switch 302. In some embodiments, the second data packet may comprise a destination ID, data content, and a response token that tells the switch 302 that the second electronic device 102b has finished transmitting data. The switch 302 may then re-transmits the second data packet, comprising the destination ID and the data content (but without the response token), which is received and accepted at a destination electronic device 102c.

After the second transaction is done, the token generation element 306 generates a third token. At a third time $t_3$, the third token is provided from the switch 302 to a third electronic device 102c. Upon receiving the third token, the third electronic device 102c is granted permission to transmit data. The third electronic device 102c transmits a third data packet to the switch 302. However, the third electronic device 102c does not have data to transmit. Therefore, the third electronic device 102c may transmit an empty data packet comprising a response token that tells the switch 302 that the third electronic device 102c has finished transmitting data.

In some embodiments, the token generation element 306 may be configured to operate in a round robin fashion, wherein the switch 302 is configured to pass the token to the plurality of electronic devices 102a-102c in a fixed cyclical order. For example, the switch 302 may be configured to pass the token to the first electronic device 102a at the first time $t_1$, to the second electronic device 102b at a second time $t_2$, to the third electronic device 102c at a third time $t_3$, to the first electronic device 102a at a fourth time $t_3$, etc.

In some embodiments, the switch 302 may be configured to selectively modify priorities associated with the electronic devices 102a-102c, either on the fly or statically. For example, the switch 302 may be configured to give higher priority to electronic devices known to have more traffic, so that an electronic device having more traffic receives the token more often than an electronic device having less traffic (e.g., if electronic device 102a has more traffic than electronic device 102b, the switch 302 can pass the token to electronic devices in the order: 102a, 102b, 102a, 102c, 102a, etc.).

Figure 4:
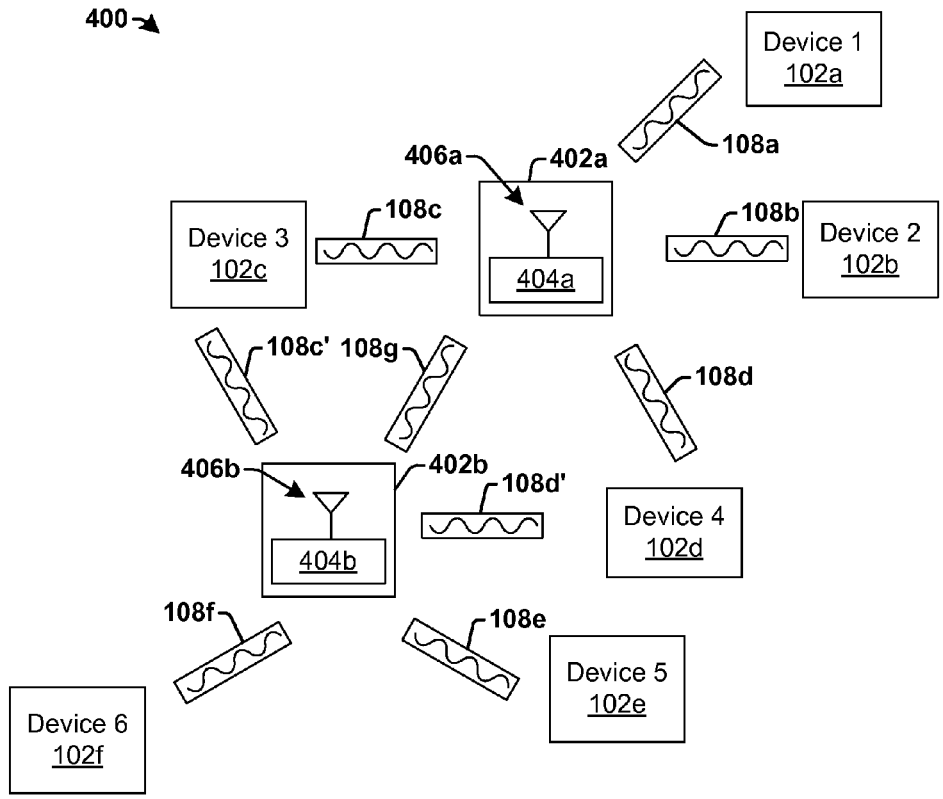
FIG. 4 is a block diagram of some embodiments of a system having a plurality of switches configured to enable communication between electronic devices.

FIG. 4 is a block diagram of some embodiments of a system 400 having a plurality of switches 404 configured to enable communication between electronic devices 102a-102f.

System 400 comprises a first switch 402a (having a first transceiver chain 404a and a first antenna 406a) in communication with a first plurality of electronic devices 102a-102d and a second switch 404b (having a second transceiver chain 404b and a second antenna 406b) in communication with a second plurality of electronic devices 102c-102f. A first plurality of dielectric waveguides 108a-108d are disposed between the first switch 402a and the first plurality of electronic devices 102a-102d. A second plurality of dielectric waveguides 108c'-108f are disposed between the second switch 402b and the second plurality of electronic devices 102c-102f. An inter-switch dielectric waveguide 108g is disposed between the first switch 404a and the second switch 402b.

In some embodiments, the electronic devices, 102c and 102d, may be connected to the first and/or second switches, 402a and/or 402b, based upon a data transfer rate of an electronic device. Since communication between the first and second switches, 402a and 402b, is at low data rate (e.g., has low traffic), while communication between a switch and associated electronic devices is at high data rate (e.g., has high traffic), communications between electronic devices (e.g., 102a/b and 102e/f) at low data transfer rate may pass through the multiple switches, 402a and 402b, while communications between electronic devices (e.g., 102a and 102b) at a high data transfer rate are connected via a single switch, 402a or 402b. For example, if electronic devices 102a and 102e communicate at a low data transfer rate, they do not need to be connected to a same switch, but rather can be interconnected via switches 404a and 404b.

In some embodiments, one or more shared electronic devices, 102c and 102d, may be redundantly connected to the first and second switches, 402a and 402b. In some embodiments, the shared electronic devices 102c-102d may comprise a safety critical device (e.g., an air bag sensor). In such embodiments, the redundancy of the first and second switches, 402a and 402b, provides the system with an improved safety feature of the device since by connecting electronic device 102c to both the first and second switches, 402a and 402b, both the first and second switches, 402a and 402b, are able to provide data packets to and/or from the electronic device 102c at a high data rate. For example, in an airbag system, redundant switches 402a and 402b can operate to receive data from electronic devices 102c and 102d. If the received data is equal, the data is considered reliable and is further processed, if the data is not equal (due to a malfunction of either electronic device 102c or electronic device 102d), the data from both 102c and 102d is ignored, and inadvertent deployment of the airbag is prevented.

Figure 5:
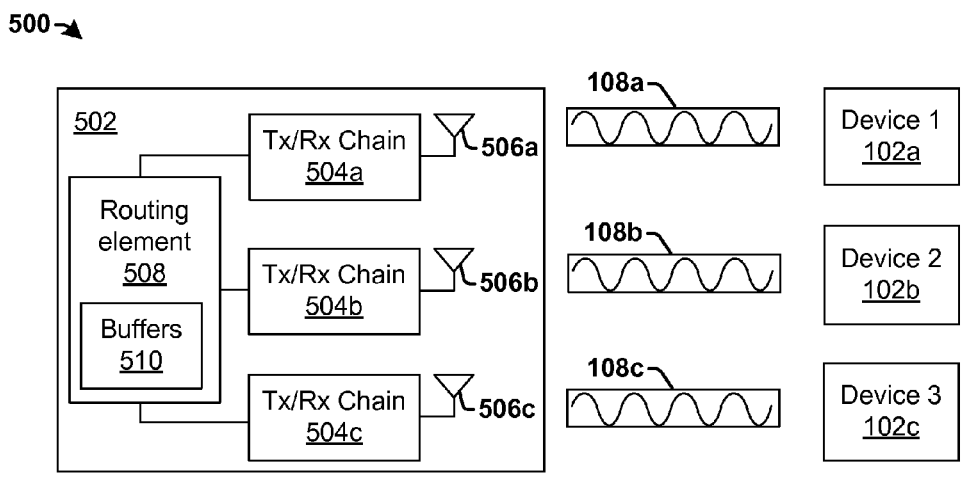
FIG. 5 is a block diagram of some alternative embodiments of a system having a switch configured to enable communication between electronic devices.

FIG. 5 is a block diagram of some alternative embodiments of a system 500 having a switch 502 configured to enable communication between electronic devices 102a-102c.

System 500 comprises a switch 502 having a plurality of transceiver chains 504a-504c configured to receive data packets from a plurality of electronic devices 102a-102c. In some embodiments, the switch 502 may have a transceiver chain 504 designated to each of the plurality of electronic devices 102a-102c, such that the switch 502 comprises a number of transceiver chains 504a-504c that is equal to the number of electronic devices 102a-102c.

For example, a first transceiver chain 504a is configured to send and/or receive data packets from a first electronic device 102a, a second transceiver chain 504b is configured to send and/or receive data packets from a second electronic device 102b, etc. By having a designated transceiver chain 504 associated with each of the plurality of electronic devices 102a-102c, the switch 502 is able to receive data from the plurality of electronic devices 102a-102c without having data collisions (i.e., the plurality of transceiver chains 504a-504c are able to receive data packets arriving simultaneously from different electronic devices 102a-102c).

In some embodiments, upon receiving a data packet, the transceiver chains 504a-504c are configured to provide the data packet to a routing element 508. The routing element 508 is configured to read a destination ID of a received data packet and to route the data packet to a transceiver chain that transmits data packet to an electronic device associated with the destination ID. In some embodiments, the routing element 508 may comprise one or more buffers 510 configured to store data packets between reception and re-transmission. The one or more buffers 510 allow the switch 502 to address potentially high data rate of the plurality of transceiver chains 504a-504c and to hold data that is to be transferred to a first electronic device (e.g., from switch 502 to 102c) while receiving data from a second electronic device (e.g., from 102b to switch 502). In some embodiments, the routing element 508 may remove the destination ID from a received data packet before routing to reduce the size of the data packet.

Figure 6:
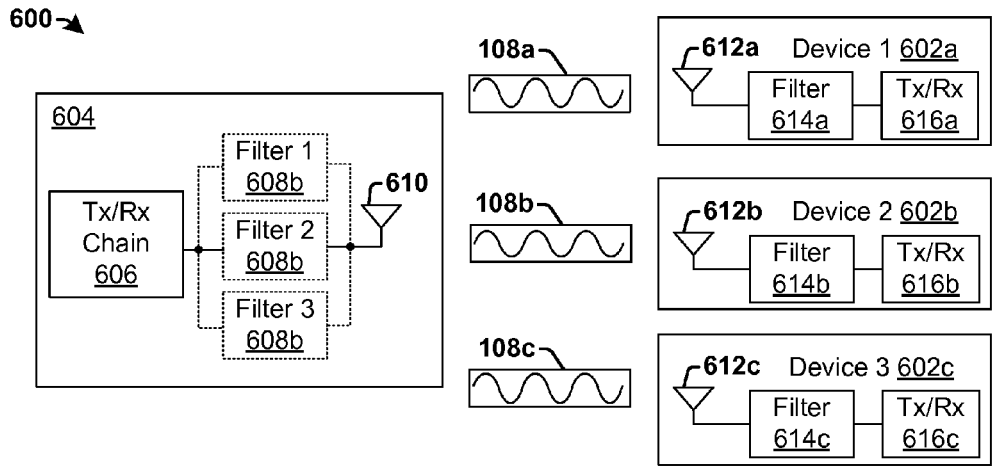
FIG. 6 is a block diagram of some alternative embodiments of a system having a switch configured to enable communication between electronic devices.

FIG. 6 is a block diagram of some alternative embodiments of a system 600 having a switch 604 configured to enable communication between electronic devices 602a-602c.

System 600 comprises a switch 604 in communication with a plurality of electronic devices 602a-602c respectively configured to operate at different frequencies. For example, a first electronic device 602a may be configured to transmit a wireless signal at a first carrier frequency range (e.g., at a carrier frequency range of approximately 120 GHz) and a second electronic device 602b may be configured to transmit a wireless signal at a different, second carrier frequency range (e.g., at a carrier frequency of approximately 200 GHz).

The switch 604 comprises an antenna 610 configured to transmit and/or receive a mixed wireless signal comprising data associated with different electronic devices 602a-602c at different frequency ranges. In some embodiments, the different frequency ranges may be orthogonal to one another. The orthogonal frequency ranges don't disturb each other so that the system 600 can achieve high transmission rates without interference.

In some embodiments, the antenna 610 is connected to a transceiver chain 606 by way of a plurality of filter elements 608a-608c. In some embodiments, the plurality of filter elements 608a-608c may comprise bandpass filters, respectively having a pass band corresponding to one of the plurality of electronic devices 602a-602c. In some embodiments, the operating frequencies of the plurality of electronic devices 602a-602c may be kept relatively far from each other so that lower quality filter elements may be used (e.g., a plurality of filters LC filters with integrated inductors).

The plurality of filter elements 608a-608c are configured to perform filtering on a mixed wireless signal comprising wireless signals received from multiple ones of the plurality of electronic devices 602a-602c, to generate signals which respectively correspond to the operating carrier frequency of one of the plurality of electronic devices 602a-602c. By performing such filtering on the mixed wireless signal, the plurality of filter elements 608a-608c can generate and/or recover data from different ones of the plurality of electronic devices 602a-602c. For example, electronic devices 602a and 602c may concurrently transmit data at 120 GHz and 200 GHz, respectively, to form a mixed wireless signal. The antenna 610 is configured to receive the mixed wireless signal and to provide the mixed wireless signal to the plurality of filter elements 608a-608c. A first one of the plurality of filter elements 608a may filter the mixed wireless signal to recover signals at 120 GHz (i.e., signals from electronic device 602a) and a second one of the plurality of filter elements 608b may filter the mixed wireless signal to recover signals at 200 GHz (i.e., signals from electronic device 602b).

In some embodiments, the transceiver chain 606 is configured to generate a re-transmitted data packet at a carrier frequency depending upon a destination ID (corresponding to a destination electronic device). For example, if a destination ID of a received data packet indicates that the data packet is to be sent to electronic device 602a, the transceiver chain 606 will modulate the data packet to a relevant carrier frequency, which will re-transmit the data packet at a frequency range that will be received by the destination electronic device 602a.

In some embodiments, the switch 604 may be configured to generate a mixed re-transmitted wireless signal comprising data packets intended for different ones of the plurality of electronic devices 602a-602c. In such embodiments, the plurality of electronic devices 602a-602c may respectively have filters 614a-614c corresponding to a frequency range of data packets that are to be received. For example, a receiving electronic device (i.e., an electronic device corresponding to a destination ID) will have a filter 614 configured to filter a signal received at an antenna 612 in a manner that allows a transceiver element 616 of the receiving electronic device to receive signals at a frequency containing a data packet, while non-receiving electronic devices (i.e., electronic devices not corresponding to the destination ID) will have filters configured to filter out the frequency range containing the data packet.

Figure 7:
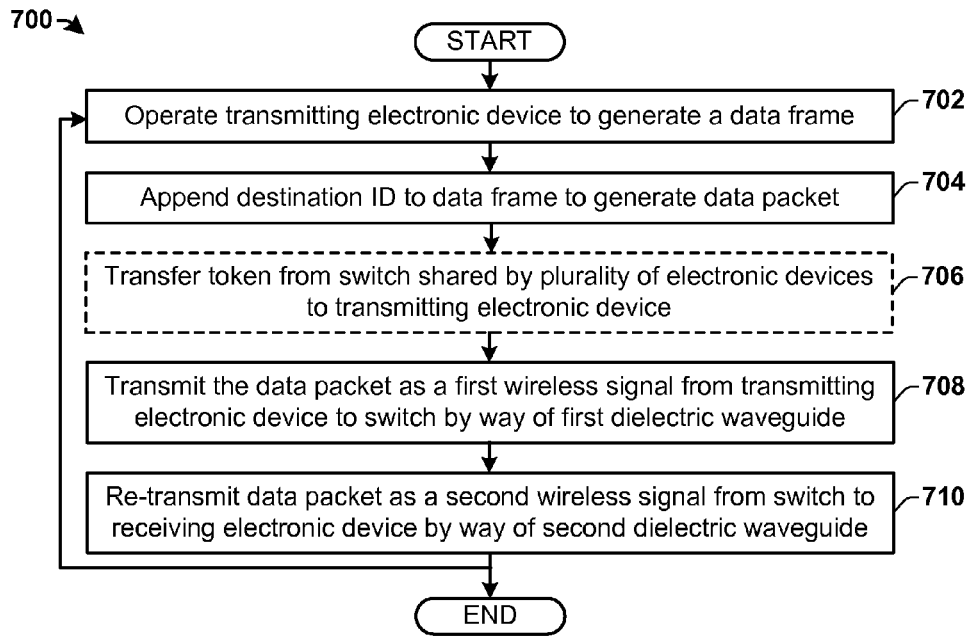
FIG. 7 is a flow diagram of an exemplary method of transferring data between a plurality of electronic devices by way of dielectric waveguides.

FIG. 7 is a flow diagram of an exemplary method 700 of transferring data between a plurality of electronic devices by way of dielectric waveguides.

It will be appreciated that while method 700 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 702, a transmitting electronic device is operated to generate a data frame.

At 704, a data packet is generated by appending a destination ID to the data frame. The destination ID designates an electronic device to which the data packet is to be sent.

At 706, a token may be transferred from a switch shared by a plurality of electronic devices to the transmitting electronic device, in some embodiments. The token is configured to grant communication rights to the transmitting electronic device.

At 708, the data packet is transmitted as a first wireless signal from the transmitting electronic device to the switch by way of a first dielectric waveguide. The data packet may be conveyed to the switch as a wireless signal that is conveyed through the first dielectric waveguide with a relatively low attenuation (e.g., an attenuation lower than that of free-space).

At 710, the data packet is re-transmitted as a second wireless signal from the switch to a receiving electronic device by way of a second dielectric waveguide. In some embodiments, re-transmission of the data packet may return the token to the switch (e.g., after one or more data packets have been transferred).

It will be appreciated that acts 702-710 may be performed iteratively to send data packets to different electronic devices within a system. For example, in some embodiments, acts 702-710 may be performed a first time to send a data packet from a first electronic device comprising a digital camera to a second electronic device comprising a micro-controller configured to process the signal received from the digital camera. Acts 702-710 may be subsequently performed a second time to send a data packet from the micro-controller to a third electronic device comprising a display.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the disclosed system is illustrated as having two offset correction circuits and two feedback loops, one of ordinary skill in the art will appreciate that a disclosed system may comprise more than two offset correction circuits and/or feedback loops.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions

What is claimed is:

1. A system, comprising:
   a plurality of electronic devices respectively comprising a transceiver element configured to generate a first wireless RF signal that transmits a data packet;
   a switch comprising an RF antenna configured to receive the first wireless RF signal from a first one of the plurality of electronic devices and to re-transmit a second wireless RF signal based on the first wireless RF signal to each of the plurality of electronic devices, wherein the second wireless RF signal comprises information that allows for an intended recipient of the second wireless RF signal to be identified;
   a plurality of dielectric waveguides comprising a dielectric material configured to convey the first and second wireless RF signals between the plurality of electronic devices and the switch, wherein respective dielectric waveguides are disposed at a location between one of the plurality of electronic devices and the switch;
   wherein the switch comprises a token generation element configured to generate a token that grants communications rights to one of the plurality of electronic devices that receives the token; and
   wherein the one of the plurality of electronic devices is configured to send a first data packet to the switch comprising a destination ID, data content, and the token, and the switch is configured to remove the token and to re-transmit the first data packet to the plurality of electronic devices with the destination ID and the data content and without the token.

2. The system of claim 1, wherein the one of the plurality of electronic devices comprises:
   a data generation element configured to generate the data content;
   an ID management element configured to generate the destination ID that designates a second one of the plurality of electronic devices to which the data content is to be sent; and
   an appending element configured to generate the first data packet by appending the destination ID to the data content.

3. The system of claim 1, wherein the switch comprises an isotropic antenna connected to the transceiver element and configured to receive the first wireless RF signal from the first one of the plurality of electronic devices and to re-transmit the second wireless RF signal with a substantially same energy over a 360° radius.

4. The system of claim 1, further comprising:
   an additional switch configured to receive an additional wireless RF signal from a first one of an additional plurality of electronic devices and to re-transmit the additional wireless RF signal to a second one of the additional plurality of electronic devices;
   an additional plurality of dielectric waveguides disposed between the additional switch and the additional plurality of electronic devices; and
   an inter-switch dielectric waveguide is disposed between the switch and the additional switch.

5. The system of claim 4, wherein the one of the plurality of electronic devices is connected to the switch by a first one of the plurality of dielectric waveguides and to the additional switch by a first one of the additional plurality of dielectric waveguides.

6. The system of claim 1, wherein the switch comprises a plurality of transceiver elements respectively configured to received data packets from a designated one plurality of electronic devices.

7. The system of claim 1, wherein the switch comprises a plurality of filter elements configured to filter the first wireless RF signal and to provide a filtered wireless RF signal to the transceiver element.

8. The system of claim 1,
wherein the system is comprised within an automobile; and
wherein the plurality of electronic devices comprise one or more of a rear car camera, a microcontroller, and a dashboard display disposed within the automobile.

9. The system of claim 1, wherein the switch is configured to sequentially provide the token to the plurality of electronic devices in a fixed cyclical order.

10. The system of claim 1, wherein the switch is configured to sequentially provide the token to the plurality of electronic devices based upon traffic received by the plurality of electronic devices.

11. The system of claim 1,
wherein the switch is configured to assign priorities to the plurality of electronic devices; and
wherein the plurality of electronic devices will receive the token with a frequency that is dependent upon the assigned priorities.

12. The system of claim 11, wherein the switch is configured to modify the assigned priorities associated with the electronic devices based on statistical data concerning the system.

13. A system, comprising:
a plurality of electronic devices respectively comprising:
a transceiver element configured to generate a first wireless RF signal that transmits a data packet;
an ID management element configured to generate a destination ID to which the data packet is to be sent;
a switch configured to receive the first wireless RF signal from a first one of the plurality of electronic devices and to re-transmit a second wireless RF signal based on the first wireless RF signal to each of the plurality of electronic devices, wherein the switch comprises:
an isotropic antenna connected to the transceiver element and configured to re-transmit the second wireless RF signal with a substantially same energy over a 360° radius;
a token generation element configured to generate a token that grants communications rights to one of the plurality of electronic devices that receives the token;
a plurality of dielectric waveguides comprising a dielectric material configured to convey the first and second wireless RF signals between the plurality of electronic devices to the switch, wherein the plurality of dielectric waveguides are disposed between the plurality of electronic devices and the switch; and
wherein the one of the plurality of electronic devices is configured to send a first data packet to the switch comprising the destination ID, data content, and the token, and the switch is configured to remove the token from the first data packet and to re-transmit the first data packet to the plurality of electronic devices with the destination ID and the data content and without the token.

14. The system of claim 13, wherein the one of the plurality of electronic devices comprises:
a data generation element configured to generate the data content; and
an appending element configured to generate the first data packet by appending the destination ID to the data content.

15. The system of claim 13, further comprising:
an additional switch configured to receive an additional wireless RF signal from a first one of an additional plurality of electronic devices and to re-transmit the additional wireless RF signal to a second one of the plurality of additional electronic devices;
an additional plurality of dielectric waveguides disposed between the additional switch and the additional plurality of electronic devices; and
an inter-switch dielectric waveguide is disposed between the switch and the additional switch.

16. The system of claim 15, wherein one of the plurality of electronic devices is connected to the switch by a first one of the plurality of dielectric waveguides and to the additional switch by a first one of the additional plurality of dielectric waveguides.

17. A method, comprising:
operating a transmitting electronic device to generate a data packet;
transmitting a first wireless RF signal comprising the data packet from the transmitting electronic device to a switch by way of a first dielectric waveguide;
using an RF antenna to re-transmit a second wireless RF signal comprising the data packet from the switch to a plurality of electronic devices comprising the transmitting electronic device by way of a plurality of dielectric waveguides, wherein the second wireless RF signal comprises information that allows for an intended recipient of the second wireless RF signal to be identified;
transferring a token from the switch shared by the plurality of electronic devices to the transmitting electronic device during a first time period, wherein the token grants communications rights to the transmitting electronic device that receives the token;
transferring the data packet comprising the token, a destination ID, and data content, from the transmitting electronic device to the switch during a second time period after the first time period;
removing the token and re-transmitting the data packet with the destination ID and the data content and without the token to the plurality of electronic devices during a third time period after the second time period; and
transferring the token from the switch to a second transmitting device during a fourth time period after the third time period.

18. The method of claim 17, further comprising:
generating a data frame; and
generating the data packet by appending the destination ID to the data frame, wherein the destination ID designates a receiving electronic device to which the data packet is to be sent.

19. The method of claim 17, wherein a first number of the plurality of electronic devices is equal to a second number of the plurality of dielectric waveguides disposed between the switch and the plurality of electronic devices.

20. The method of claim 17, further comprising:
transferring the token from the switch to a second transmitting electronic device during a fifth time period; and
transferring a second data packet comprising the token and without data content from the second transmitting electronic device to the switch during a sixth time period.

\* \* \* \* \*